(No Model.) 2 Sheets—Sheet 1.
I. N. LEWIS.
CAR LIGHTING.
No. 516,496. Patented Mar. 13, 1894.
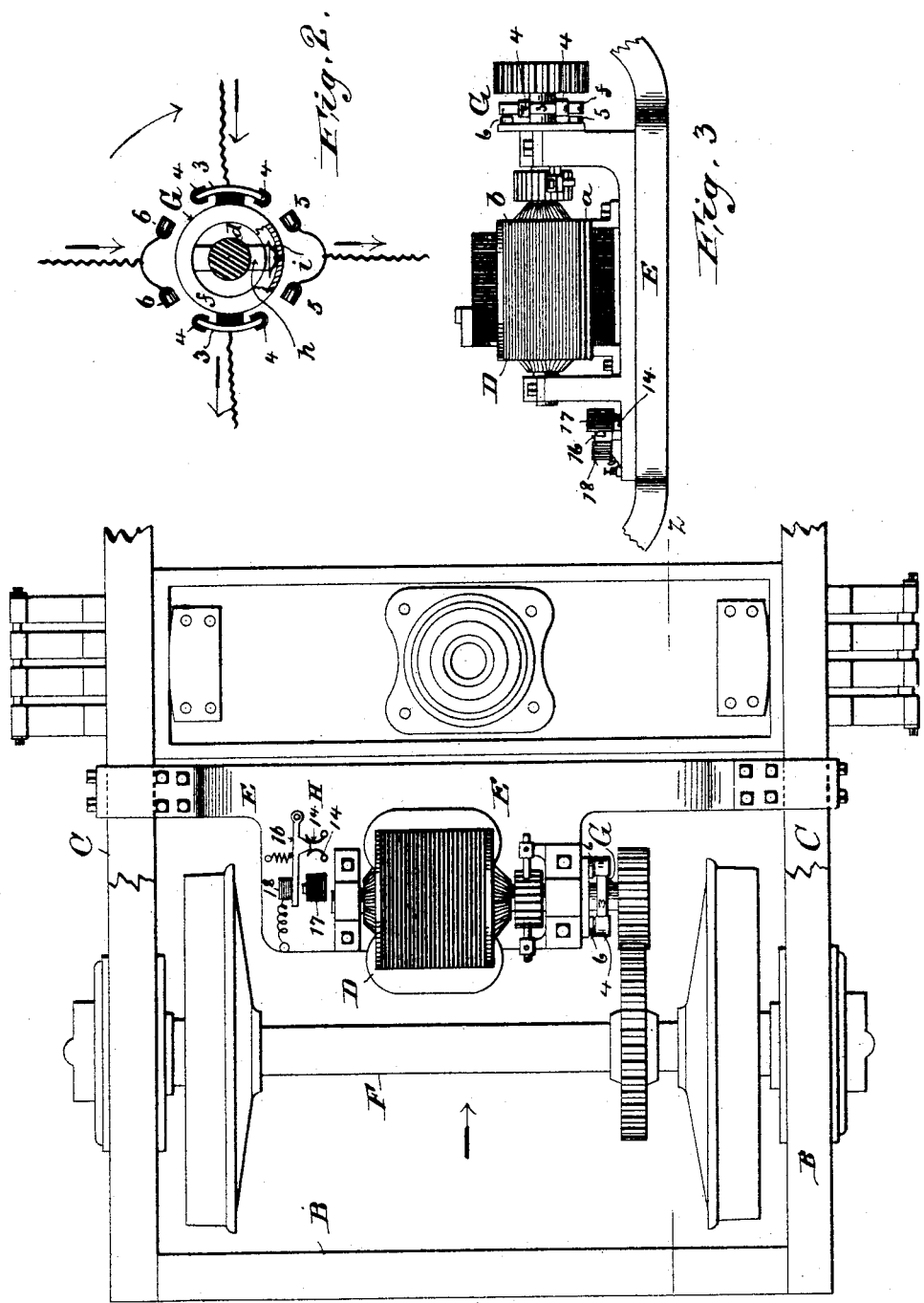

(No Model.) 2 Sheets—Sheet 2.
I. N. LEWIS.
CAR LIGHTING.
No. 516,496. Patented Mar. 13, 1894.
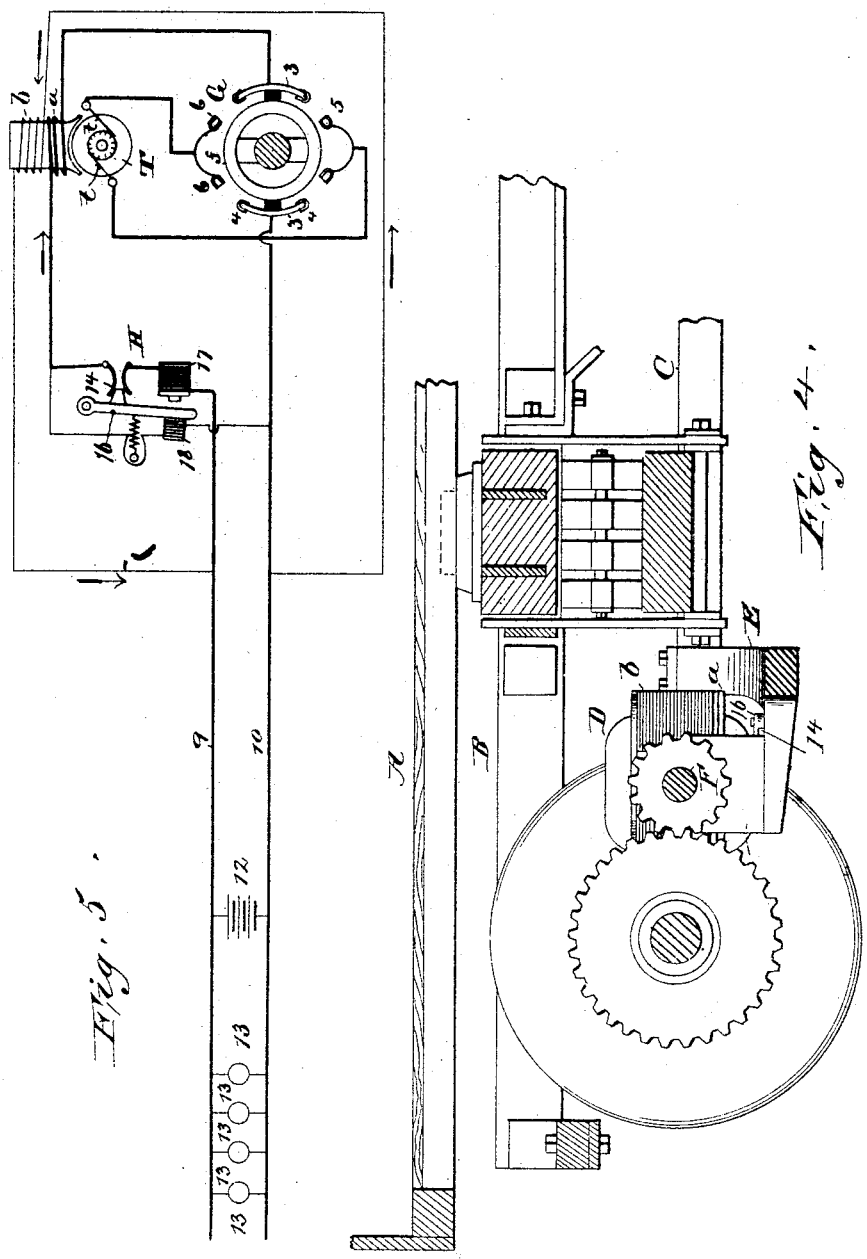

UNITED STATES PATENT OFFICE.

ISAAC N. LEWIS, OF FORT WADSWORTH, NEW YORK, ASSIGNOR TO THE LEWIS ELECTRIC COMPANY, OF NEW JERSEY.

CAR-LIGHTING.

SPECIFICATION forming part of Letters Patent No. 516,496, dated March 13, 1894.

Application filed September 6, 1893. Serial No. 484,897. (No model.)

*To all whom it may concern:*

Be it known that I, ISAAC N. LEWIS, a citizen of the United States, and a resident of Fort Wadsworth, in the county of Richmond and State of New York, have invented a certain new and useful Car-Lighting, of which the following is a specification.

My invention relates to that class of electric apparatus wherein the electric energy for operating lamps or other translating devices is obtained from a dynamo electric machine driven by a variable speed power and operated in connection with a storage battery which is charged from the dynamo and supplies the energy for operating the translating devices when there is an intermission of driving power.

The invention is designed especially for use with dynamos placed on railway cars and driven by the power which propels the car, for which purpose the said dynamo is usually connected in any suitable manner to the car axle, but some of the features of the invention are applicable when the dynamo is driven by a windmill or other natural force of varying power and speed. I shall, however, describe the invention in detail as applied to a railway car for furnishing electricity to heat, light or ventilate the same or for other purpose.

My invention is designed to furnish a simple and effective apparatus and consists first in the combination with a working circuit containing lamps or other translating devices, of a storage battery, and a self-regulating dynamo feeding said battery and translating devices, said dynamo having a field exciting coil fed from the battery and an opposing field coil in the main circuit with the armature.

Another feature of my invention relates to the provision made for reversal of the rotation of the armature when the car reverses its direction of travel, the object being to prevent reversal of the electric current delivered by the self-regulating dynamo. This part of my invention involves an automatic pole changer which is made responsive in any desired way to the reversal of the driving power and is combined with the compensating or regulating circuit of the self-regulating dynamo as hereinafter more particularly described.

My invention consists further in details of construction and combinations of parts more particularly specified in the claims at the end of this description.

In the accompanying drawings:—Figure 1, is a general plan of the truck and dynamo mounted thereon. Fig. 2, is an end elevation of the frictionally operated pole changer. Fig. 3, is a side elevation of the dynamo detached. Fig. 4, is a vertical section through the car axle, dynamo shaft and truck. Fig. 5, is a diagram illustrating the connection of the parts of the apparatus.

A, is the car sill or floor; B, the beam of the car truck which carries the swinging bolster; C, the equalizing bars of the truck.

D, is the dynamo which supplies the electrical energy for operating the lamps or other devices on the car and also for charging the battery. The dynamo D, is preferably mounted in the manner described in a prior application for patent filed by me July 15, 1893, Serial No. 480,578, upon the cross beam or bar E, which is attached to the equalizing bars, or it may be mounted directly upon the truck frame. The dynamo is driven by direct connection with the car axle F, for which purpose the latter may have a gear wheel secured to it that gears with a smaller wheel upon the armature shaft, as shown. The proportion of gears is such as to give the desired armature speed under average speed of the car. The dynamo itself is preferably one with its brushes at zero lead irrespective of the direction of rotation of the armature. As will be seen, under this arrangement, the armature rotates sometimes in one direction and sometimes in another depending upon the direction in which the car is moving.

The dynamo itself is constructed in any proper manner to be self-regulating in itself by a proper winding of its field magnets thereby enabling me to dispense with the governor mechanisms or similar speed responsive devices heretofore employed for adjusting the voltage of the dynamo to prevent its rising when the car travels at a high rate of speed.

The compensating or adjusting coil of the self-regulating dynamo which is of coarse wire, is indicated at $a$. This coil is made to carry a current which increases with the speed of the armature but which is properly applied to the machine to tend to cut down the electro-motive force of the armature at such increased speed. The preferred manner of applying it is as a field magnet coil, as indicated more fully in the diagram.

The main or exciting coil of the machine indicated at $b$, determines the polarity of the field magnets, and is supplied with exciting electrical energy from any desired source preferably direct from the storage battery which is charged by the armature. By this means the field coil $b$, provides a practically constant excitation, but the coil $a$, operates to cut down the field magnetism developed by $b$, when the armature speed rises and causes an increased current to flow in the coil $a$. The compensating action arises from the fact that as the speed rises so that with the same field magnetism there would be an increased electro-motive force current on the line, the coil $a$, operates to cut down the field magnetism and to preserve the voltage constant.

As it is desirable when the machine is used as I have described upon a car or in other situations where there is variable driving power that the electro-motive force of the machine should rise to the desired point without opposition until the critical or desired speed is reached, I construct the coil $b$, or give it a sufficient number of turns to not only excite the field magnet to saturation but to provide a surplus exciting power which is not overcome by the coil $a$, as the armature begins to rotate but which surplus is practically balanced by the action of the coil $a$, when the desired critical speed or electro-motive force of armature is reached. Any further increase of current in coil $a$, will thereafter tend to operate to cut down the field magnetism so that any further increase of speed will not result in increasing the electro-motive force beyond what is desired.

The manner of connecting the coils and other devices to be presently described, will be seen more clearly from the diagram to which further reference will be presently made.

To prevent reversal of current in the coil $a$, when the armature changes its direction of rotation by reversal of the driving power, I employ an automatic pole changer of any desired description which is responsive to the reversal of the driving power. Such pole changer may obviously, and as well understood in the art, be either electrically or mechanically operated. I prefer, however, to use a mechanically operated pole changer which is actuated by friction and is mounted directly on the armature shaft. The frictional connection is sufficient to reverse the position of the pole changer at the proper times and hold it in reversed position.

G, indicates a pole changer for this purpose. That shown consists of a ring or support $f$, from which project inwardly a pair of friction shoes $h$, held by the action of springs $i$, in contact with the armature shaft $d$. The friction shoes $h$, are properly attached to the inside of the ring or frame $f$. The frame or support $f$, carries the movable part of the pole changer. Said movable part comprises a pair of contacts 3, in the form of segments, preferably, which are shod at opposite ends with copper strips 4. The opposite ends of the contacts 3, are adapted to engage with contacts 5 and 6, the pair 6, forming one of the fixed poles of the pole changer and the pair 5, the other pole, as clearly indicated in the drawings. The contacts 3, are insulated from one another by suitable insulation on the frame or carrier $f$, and have flexible or other connections with the two poles of the external circuit while the fixed contacts 6 and 5, form the opposite terminals of the source of energy which is by the action of the pole changer made to flow always in the same direction on the circuit connected to the contacts 3.

H, is the electro magnetic switch that controls the connection of the armature with the circuit leading to the battery and the translating devices. The main circuit leading to the battery and translating devices is indicated by the numerals 9, 10, while 12, indicates the storage battery and 13, the lamps or other translating devices. The coil $b$, of the dynamo is connected to the wires 9, 10, as shown, so that a constant current from the storage battery will flow therethrough.

The armature of the machine is indicated at T, in the diagram, while $t$, indicates the commutator brushes. One brush connects to the contacts 6, and the other to the contacts 5. One of the contacts 3, leads direct to the wire or main 10, while the other is connected to the other main through the coil $a$, and the contacts 14, of the electro-magnetic switch when said contacts are closed by the action of the magnets.

16, is a switch lever which carries a stud or contact adapted to complete the circuit at 14, in obvious manner thereby allowing the current from the armature to flow through coil $a$, to the main line through the coarse wire coils 17 of an electro-magnet, the office of which is to hold the switch lever closed when it has been once operated to close the connection 14.

In a branch independent of the main circuit is a coil 18, which operates to polarize the switch in the manner to be presently described and further serves to initially operate the same to cause it to complete connection at 14. The branch in which the coils 18, are included is taken, as shown, from one wire 10, to the wire leading to the coil $a$, so that when the machine starts into operation and the pole changer makes the connection between the contacts 3, and contacts 6 and 5, the current from the armature may flow through the pole changer, the coils $a$, the coils 18, of the magnet, and back through the pole changer to the armature. Coil 18, is applied upon the end of lever 16, in the manner to develop a pole opposite the pole of the magnet 17. When, therefore, the current flows in coil 18, to sufficient degree to overcome the retractor of the switch, the armature will be drawn up. The magnet whose coils are indicated at 17, will now be energized and by proper winding of the coils so as to develop a pole the opposite to that developed by coils 18, the switch will be strongly held in position by the attraction of such opposite poles. Should, however, at any time, the current from the battery 12, flow in reverse direction through coils 17, to coils $a$, and armature, the pole of the magnet will be reversed and repel the switch so as to open the circuit and protect the armature of the machine. It will be noticed that the connection of the coil 18, from the main circuit is taken at a point between the pole changer and the storage battery or in other words at such point that the current will always flow in the same direction through the coil 18, and give the required constant polarity in the polarized switch so that the discharge or back flow of current through it from the battery will produce a positive repulsive effect or effect in the opposite direction to that which is required to close the switch. Hence, should the switch be closed by hand or accidentally when the dynamo is at rest the back flow of current in coil 17, will immediately forcibly repel the switch and open the circuit. It will be understood that this action is independent of any mere weakening of current which might take place on the main as the armature speed slows down, and is also independent of any position in which the pole changer may be when the discharge takes place. On the other hand the main coil being in a portion of the circuit where the discharge current may flow in an opposite direction to the charging current, the reversal of current therein will reverse the polarity and cause the repulsion. When at any time the direction of rotation of the armature is changed which, as is well understood, would change the polarity of current delivered from the armature T, the frictional switch described will reverse its position so that, although the current may be delivered in opposite direction from the armature, it will nevertheless flow always in the same direction through the coil $a$, which may, therefore, in the travel of the car in either direction operate in proper manner as the compensating coil to keep the electro-motive force constant.

The general operation is, briefly speaking, as follows:—When the car is at rest the parts may be in the position shown in the diagram or the pole changer may stand in the position in which it was left when the car came to rest. When the car begins to move the armature begins to revolve in the field produced by the coils $b$, and begins to deliver current through the coil $a$, and the coil 18, the pole changer operating as already explained to determine the direction of the current's flow. As the speed of the armature rises the voltage rapidly rises, since as already explained, the current in the coil $a$, is not at first sufficient to overcome the surplus magnetizing power of the coil $b$, and the field remains at saturation. When, however, the armature reaches a certain speed which may, if desired, correspond to a car speed of twenty miles an hour, the current in the coils $a$, and 18, will have risen to such an extent that the switch will be operated to close the connection between the machine and the external circuit 9, 10, and the current now flowing in the coil $a$, will be practically the same as the surplus magnetizing current of the coil $b$. Hence the field magnetism at this critical speed of twenty miles an hour will be practically that of saturation subject to being decreased in amount if the current in coil $a$, increases. Now, if the speed rises beyond twenty miles an hour, it is obvious that with an increased armature speed the electro-motive force of the armature and the current on the circuit would rise if the field magnetism be maintained at the saturated amount, but for the reasons already explained, the current in the coil $a$, now becomes sufficient to begin to cut down the field magnetism so that, although there may be a greater armature speed, the field magnetism will be less and hence the same electro-motive force will be developed. The action of the coil $a$, is, therefore, to preserve the constant electro-motive force of the armature at all speeds above the desired critical or adjusted speed and its practical effect is to absolutely prevent any dangerous increase in voltage however fast the car may move. When the car comes to a stop, it is quite obvious that the current from the battery 12, will tend to discharge itself through the coil 17, but as before explained the switch being a polarized switch polarized by the action of coil 18, the switch will be immediately opened by the repulsive effect. The action of switch H, is, as will be seen, to close the circuit when the desired speed has been reached in the armature and said switch forms a simple electrical appliance for the purpose, I prefer to employ an electrical device in place of the mechanical appliances described in my prior application for patent before referred to, since I am enabled to dispense with the use of governor balls and other mechanical expedients.

While I have described the use of a pole changer which is mechanically or frictionally operated, I do not wish to be understood as limiting myself thereto since, as is well understood in the art, other constructions of pole changer not mechanically operated but nevertheless responsive to a reversal in the direction of rotation of the armature might be employed in its place. It will be noticed that the switch controlling the connections of the armature with the main circuit is mounted to work in a horizontal plane so as to be unaffected by vertical vibrations during running of the car.

I have described one manner of winding the dynamo electric machine and connecting it to suitable sources of electric energy so that it will be self regulating as described for differences of speed, but it is obvious that that feature of my invention which consists in mounting a dynamo on the car truck and constructing it so that it shall deliver a constant potential for varying speeds of the car without the use of extraneous mechanisms, such as ball governors for varying the magnetic field, may be carried out by the use of any suitably wound dynamo which will have in itself the electrical elements that will make it deliver a constant electro-motive force for variations of speed above a certain determined speed say of twenty miles an hour. By the use of this kind of regulating dynamo I am enabled to mount the dynamo itself on the car truck in close mechanical relation to the car axle and to dispense with the use of extraneous regulating mechanisms which in this position would be especially subject to injury.

What I claim as my invention is—

1. The combination with a working circuit containing lamps or other translating devices, of a storage battery, and a self-regulating dynamo feeding said battery and translating devices, said dynamo having a field exciting coil fed from the battery and an opposing field coil in the main circuit with the armature.

2. The combination with a dynamo machine having a main circuit compensating coil which tends to cut down the field magnetism, of a reversible driving power, and a pole changer responsive to the reversal, and connected into the circuit between the armature and said main circuit coil.

3. The combination with a dynamo machine, of a reversible driving power, a compensating coil connected to the armature and adapted to oppose the rise of electro-motive force from increase of speed, and a pole changer between said coil and armature, as and for the purpose described.

4. The combination, substantially as described, of a dynamo, a variable speed driving power, therefor, a storage battery connected to the armature, a field exciting coil connected thereto and adapted to furnish a magnetizing influence above that necessary to saturate the field magnet, and an opposing coil for cutting down the electro-motive force of the armature, said opposing and exciting coils being related as described so that the super-magnetizing power of the exciting coil will be overcome when the armature reaches the desired critical speed beyond which the electro-motive force is to be kept constant.

5. The combination, substantially as described, on a railway car, of a dynamo electric machine mounted on the car truck and driven from the axle, a storage battery connected across the supply wires leading from the armature, a field exciting coil for said machine fed from the storage battery, and a compensating opposing field coil in the circuit of the armature, as and for the purpose described.

6. The combination, substantially as described, of a dynamo machine, a variable speed driving power therefor, a storage battery, an electro-magnetic switch controlling the connection thereof with the dynamo, the compensating coil on said dynamo in the main circuit with the armature thereof for adjusting the voltage thereof to the changes of speed, and a branch circuit from the main circuit to the battery, containing a controlling coil of said switch, as and for the purpose described.

7. The combination, substantially as described, of a dynamo machine having a storage battery, the compensating coil in the direct armature circuit, and an electro magnetic switch controlling the connection of the armature with the battery, said switch having two coils one in the branch of the main and the other in the main circuit closed by the switch, as and for the purpose described.

8. The combination with a working circuit containing lamps or other translating devices, of a storage battery, and a self-regulating dynamo feeding said battery and translating devices, said dynamo having a field exciting coil fed from any desired source and an opposing field coil in the main circuit with the armature.

9. The combination, substantially as described, on a railway car, of a dynamo electric machine mounted on the car truck and driven from the axle, a storage battery connected across the supply wires leading from the armature, a field exciting coil, and a compensating opposing field coil in the circuit of the armature, as and for the purpose described.

10. The combination, substantially as described, on a railway car, of a dynamo electric machine mounted on the car truck and wound with opposing coils to be self-regulating, as described, for differences of speed, means for driving the armature of the dynamo from the car axle and a storage battery connected across the supply wires leading from the dynamo.

11. In an apparatus for producing a constant supply of electricity from a driving power of variable speed, the combination, substantially as described, of a dynamo electric machine compound wound with opposing helices to be self-regulating as set forth for differences of speed of said driving power, and a storage battery connected to the supply wires leading from said dynamo and in shunt to the translating devices that have the constant supply.

Signed at New York, in the county of New York and State of New York, this 5th day of September, A. D. 1893.

ISAAC N. LEWIS.

Witnesses:
WM. H. CAPEL,
THOS. F. CONREY.